Sept. 30, 1958 J. L. M. REIJNDERS 2,854,531

DIRECT-VOLTAGE AMPLIFIER

Filed July 29, 1954

INVENTOR
JOSEPH LODEWIJK MARIA REIJNDERS
BY [signature]
AGENT

United States Patent Office 2,854,531

Patented Sept. 30, 1958

2,854,531

DIRECT-VOLTAGE AMPLIFIER

Joseph Lodewijk Maria Reijnders, Eindhoven, Netherlands, assignor, by mesne assignments, to North American Philips Company, Inc., New York, N. Y., a corporation of Delaware Application July 29, 1954, Serial No. 446,526

Claims priority, application Netherlands August 5, 1953

4 Claims. (Cl. 179—171)

This invention relates to a direct-voltage amplifier comprising a direct coupling for very low voltages, more particularly for measuring purposes. The term "direct voltage amplifier" is to be understood here to mean an amplifier which amplifies not only direct voltages, but also alternating voltages of very low frequencies. Difficulties arise in such amplifiers for very low voltages due to the unavoidable variations in cathode energy. In order to compensate for them, it is known to include a resistor in the cathode lead, which resistor also forms part of the circuit between the cathode and a control grid, so that the variations occurring across this resistor are active in the control-grid circuit.

In order to prevent said resistor from bringing about unwanted feed-back coupling for the signal voltage, a distribution control for the signal voltage is provided, as is also known. This has resulted in a circuit in which the first grid of a tube comprising at least four grids has a constant biassing potential, the second and fourth grids are positive and the input voltage is active at the third grid which is provided between the last mentioned grids. A current distribution control is thus obtained between the anode and the second grid. The amplified signal voltage is commonly derived from the anode.

The invention is based on recognition of the fact that microphony effect can still occur in the aforementioned circuit and that this effect can be avoided by means of a combination of steps and an unusual proportioning of the resistors included in the circuits of the various current conveying electrodes.

The invention consists in that in a direct-voltage amplifier in which use is made of a tube comprising at least four grids and resistors are included in the cathode lead and the leads to the current-conveying grids and in which the first grid has a constant biassing potential, a cathode resistor is provided in the circuit between the cathode and the third grid, which serves as a control grid and a coupling exists between the second and fourth grids, the cathode resistor and the coupling being such that the dynamic slope of the third grid with respect to the anode is considerably higher than the static slope and preferably high with respect thereto, and furthermore microphony effects and influences of variations in emission are suppressed.

It is to be noted that in amplifiers of the kind described in the preamble it is known to apply positive potentials to the two positive grids via separate resistors. The desired compensation is thus not obtained. Furthermore, in known amplifiers the cathode resistor has a comparatively low value, so that the microphony effect is at the most reduced to a certain extent. According to the invention, the cathode resistor has a value several times higher than that which would be required for suppression of the microphony effect. This serves to compensate also for the temperature influences which are interfering to a much greater extent.

The first grid may serve as a negative feed-back grid and for this purpose the output voltage or a variable part thereof is active between the said grid and the cathode.

The second and fourth grids may be connected via a common resistor to a point of positive potential. The desired coupling between the said grids may alternatively be obtained by including a resistor between them and connecting the second grid by way of a resistor to a point of positive potential. The last-mentioned grid then has the higher potential, which is in most cases the optimum adjustment.

Use is preferably made of a so-called triode-heptode in which a heptode system and a triode system having a common cathode are enclosed in a common envelope. According to the invention, the triode may be used for adjusting the voltage loss across the cathode resistor and for this purpose the biassing potential of the triode grid is made adjustable.

In order that the invention may be readily carried into effect, it will now be described with reference to the accompanying drawing, given by way of example, in which.

Figure 1:
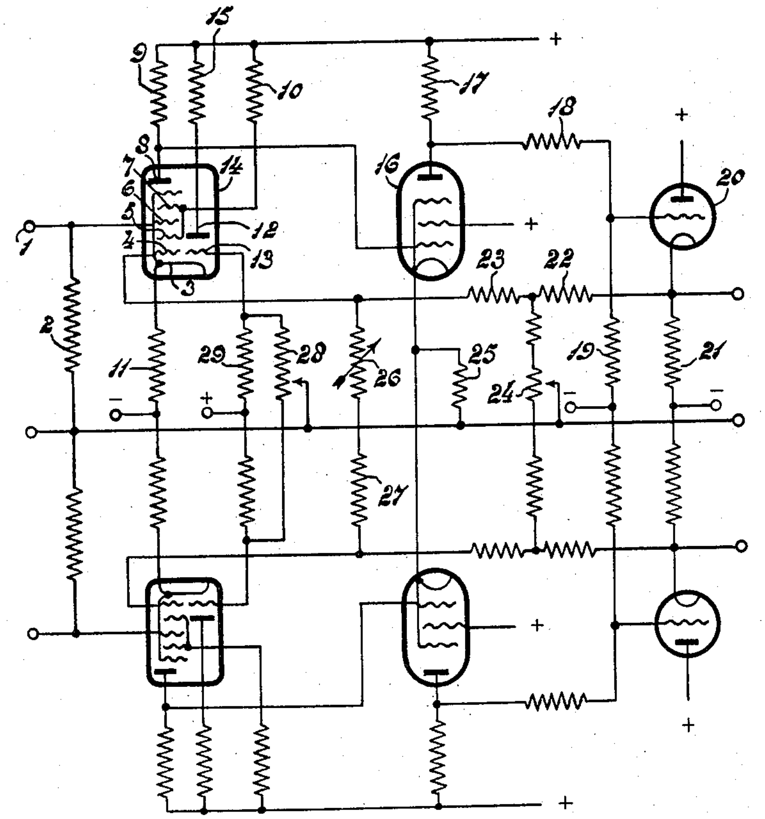
Fig. 1 is a schematic diagram of a push-pull amplifier comprising three stages of which the first is designed in accordance with the invention. However, since the invention is also applicable to amplifiers which are not connected in push-pull only the elements of one half of the push-pull circuit are described hereinafter.

Referring now, in more detail, to Fig. 1, the voltage to be amplified is active between the input terminal 1 and the grounded zero-point of the circuit. A high leak-resistance may be connected between the said terminals. The terminal 1 is connected directly to the third grid of a heptode system which furthermore comprises a cathode 3, a first grid 4, the interconnected screen grids 5 and 7, a suppressor grid connected to the cathode, and an anode 8. The anode is connected by way of a coupling resistor 9 to the positive terminal of a source of supply. The voltage thereof may be, for example, 400 volts.

According to the invention, the cathode is connected by way of a resistor 11 to a point of constant negative potential of, say, 125 volts, the screen grids 5 and 7 being connected by way of a common resistor 10 to a point of constant positive potential, in the case under consideration positive terminal of the anode source of supply. The values of the resistors are such that not only accidental variations in the emission from the cathode are suppressed, but also a high degree of freedom of microphony effect is obtained.

It may be proven that the said conditions may be satisfied simultaneously by suitable choice of the resistors 10 and 11, while a high dynamic slope of the third grid with respect to the anode is obtained under these conditions.

Suitable values of resistors 10 and 11 are 180 kilohms and 20 kilohms respectively.

The control grid 4 may have a low negative or positive biassing potential and serves to determine the emission. It has furthermore been found that it is thus possible to obtain a very high dynamic slope of the third grid with respect to the anode, which slope is, for example, a factor from 10 to 50 times greater than the static slope.

According to the invention, the control grid 4 may also serve to bring about negative feedback coupling for linearizing the characteristic curve of the tube and stabilizing the operation thereof. The negative feedback voltage is obtained in the manner which will be described hereinafter.

The amplified voltage is derived from the anode of the system and may be used directly as a measuring voltage, for example as a deflection voltage of a cathode-ray oscillograph (not shown in the figures). As a rule, it will be necessary to utilize a further amplification, but in this case the subsequent stages may be connected in a simpler manner, the voltage to be amplified being higher. In the system shown, the second amplifying stage includes a pentode 16, of which the anode is connected by way of a coupling resistor 17 to the positive terminal of the source of supply and of which the cathode is connected by way of a resistor 25 to the zero-point of the circuit to obtain the correct static adjustment. The amplified voltage is derived from the anode of pentode 16 and supplied by way of a resistor 18 to the control grid of a triode 20, which is connected as a cathode follower. The anode of the triode 20 is connected directly to a voltage of, for example, 150 volts and the cathode is connected by way of a resistor 21 to a negative voltage of, for example, 125 volts. The output voltage of the amplifier circuit is derived directly from the cathode of the triode 20 and may be supplied, for example, to a deflecting electrode of a cathode-ray tube. The output point is also connected via resistors 22 and 23 to the control grid 4 of the aforementioned heptode system, resulting in the desired negative feedback coupling of this system. In order to obtain the correct biassing potential for the control grid of tube 20, it is also connected by way of a resistor 19 to a point of negative potential.

The negative feedback coupling is preferably adjustable in order to control the amplification. This may be insured by the use of a resistor 26 which is connected, in series with a fixed resistor 27, between the first control-grids of the heptodes of the push-pull circuit. In order to compensate for small differences between the two halves of the push-pull circuit, a potentiometer 24 is provided between the common points of the resistors 22 and 23, which potentiometer permits the adjustment of the ratio of the two back-coupled voltages.

Figure 2:
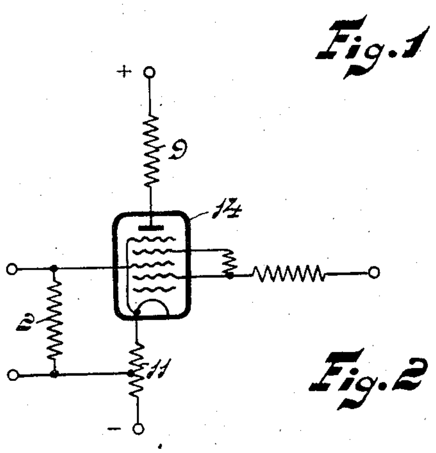
Fig. 2 is a schematic diagram of a modification of the heptode system of the amplifier circuit of Fig. 1.

According to the invention, when use is made of the triode-heptode tube 14, shown in Figs. 1 and 2, the triode system may serve to obtain a desired voltage loss across the cathode resistor 11. For this purpose the control grid 13 of the triode portion of the tube 14 of Fig. 1 is connected to a potentiometer circuit comprising two resistors 28 and 29, the first of which is variable. This resistor, which is of the potentiometer type is included between the control grids of said triode portions and has its sliding contact connected to ground, which permits the obtaining of correct push-pull adjustment. The anode is connected by way of a resistor 15 to a point of positive potential, the resistor 15 having a value such that the desired effective cathode resistance results.

In the heptode system modification of Fig. 2, the desired coupling between the second and fourth grids of the heptode is obtained by interconnecting them via a resistor, and connecting only the second grid via a resistor to the positive terminal of the source of supply.

It may be desirable, as shown in Fig. 2, to connect the point of resistor 2 which is remote from the control grid 6 to a point of resistor 11, the input voltage being supplied across the resistor 2.

What is claimed is:

1. A direct voltage amplifier comprising an electron discharge device having an anode, a cathode and at least four grids, a source of voltage supply, means for applying a constant biasing potential to the first of said grids, a first resistor, means for connecting the second of said grids and the fourth of said grids to each other and to a terminal of said supply source through said first resistor thereby providing signal coupling between said second and fourth grids, means for applying an input voltage to the third of said grids to effect a current distribution control between said anode and said second grid, a second resistor connected between said cathode and the remaining terminal of said supply source, said second resistor having a resistance of at least 5000 ohms, said first and second resistors having values of resistance whereby the dynamic slope of said third grid with respect to said anode is substantially higher than the static slope thereof thereby suppressing microphony effects and influences of variations in emission of said cathode, and means for deriving an output voltage from said anode.

2. A direct voltage amplifier comprising a first electron discharge device having an anode, a cathode and at least four grids, a source of voltage supply, means for applying a constant biasing potential to the first of said grids, a first resistor, means for connecting the second of said grids and the fourth of said grids to each other and to a terminal of said supply source through said first resistor thereby providing signal coupling between said second and fourth grids, means for applying an input voltage to the third of said grids to effect a current distribution control between said anode and said second grid, a second resistor connected between said cathode and the remaining terminal of said supply source, said second resistor having a resistance of at least 5000 ohms, said first and second resistors having values of resistance whereby the dynamic slope of said third grid with respect to said anode is substantially higher than the static slope thereof thereby suppressing microphony effects and influences of variations in emission of said cathode, a second electron discharge device having an anode, a cathode and a grid, direct current conductive means for connecting the anode of said first electron discharge device to the grid of said second electron discharge device, direct current conductive means for applying a negative feedback voltage from the cathode of second electron discharge device to said first grid of said first electron discharge device, and means for deriving an output voltage from said cathode of said second electron discharge device.

3. A direct voltage amplifier as claimed in claim 2, further comprising a connecting resistor, means for connecting the fourth of said grids to the second of said grids through said connecting resistor, and means for connecting said second grid to the first-named terminal of said supply source through said first resistor.

4. A direct voltage amplifier as claimed in claim 2, further comprising a point on said second resistor and means for applying said input voltage between the third of said grids and said point.

References Cited in the file of this patent

UNITED STATES PATENTS

| | | |
|---|---|---|
| 2,079,655 | Markus et al. | May 11, 1937 |
| 2,125,719 | Harries | Aug. 2, 1938 |
| 2,228,080 | Herold | Jan. 7, 1941 |
| 2,383,345 | Seiler | Aug. 21, 1945 |
| 2,543,940 | Sands | Mar. 6, 1951 |
| 2,603,720 | Cook | July 15, 1952 |